United States Patent [19]

Maeda

[11] Patent Number: 4,886,314
[45] Date of Patent: Dec. 12, 1989

[54] FRONT STRUCTURE FOR AUTOMOTIVE VEHICLES
[75] Inventor: Ryoji Maeda, Zama, Japan
[73] Assignee: Nissan Motor Co., Ltd., Yokohama, Japan
[21] Appl. No.: 304,096
[22] Filed: Jan. 31, 1989
[30] Foreign Application Priority Data Feb. 9, 1988 [JP] Japan .................................. 63-28533
Feb. 10, 1988 [JP] Japan ............................ 63-16680[U]

[51] Int. Cl.$^4$ ............................................. B62D 27/00
[52] U.S. Cl. .................................... 296/192; 296/194; 296/188
[58] Field of Search ............... 296/192, 194, 201, 202, 296/188, 29

[56] References Cited
U.S. PATENT DOCUMENTS 4,270,793 6/1981 Harasaki et al. .................... 296/192
4,466,654 8/1984 Abe ..................................... 296/192
4,545,612 10/1985 Harasaki ............................. 296/192
4,717,198 1/1988 Komatsu ............................ 296/192
4,789,198 12/1988 Ide ..................................... 296/192

FOREIGN PATENT DOCUMENTS 59-172615 11/1984 Japan .

Primary Examiner—Robert R. Song
Attorney, Agent, or Firm—Pennie & Edmonds

[57] ABSTRACT

In a front structure for an automotive vehicle, a brace is provided for preventing a hood ledge panel integrally formed with a strut mount housing from leaning toward an engine compartment together with a hood ledge reinforce, etc. The brace extends between each lateral end of an air box and the hood ledge panel and is secured to same. The brace is further secured to a front pillar and formed with a portion adapted for installation of a wiper pivot.

8 Claims, 5 Drawing Sheets

FIG. 5
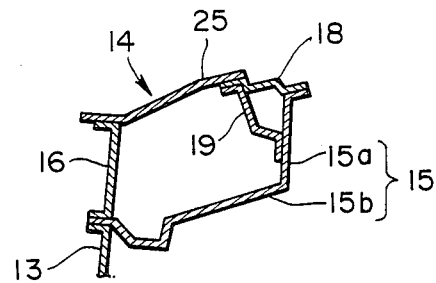
FIG. 6 FIG. 7
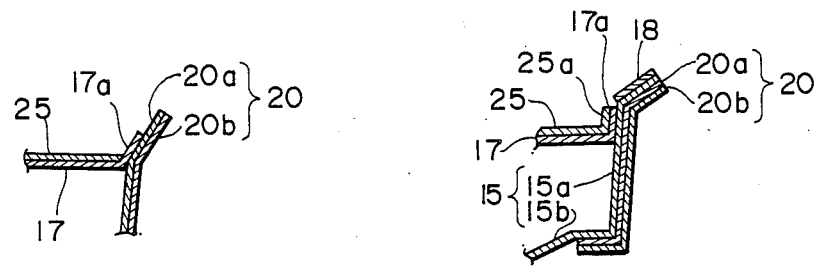

FRONT STRUCTURE FOR AUTOMOTIVE VEHICLES

BACKGROUND OF THE INVENTION

I. Field of the Invention

The present invention relates in general to automotive vehicle body constructions and more particularly to an automotive vehicle air front structure adjacent the lateral ends of an air box.

II. Description of the Prior Art

In an automotive vehicle as a passenger car or the like, it is a usual practice to provide, as shown in FIG. 8, a vehicle floor (not shown) integrally with a dash lower panel 1 which extends vertically and laterally of a vehicle body, and dispose an air box 3 at the upper end of the dash lower panel 1.

The air box 2 consists of a dash upper panel 3, cowl top front plate 4 and dash side panel 5. The dash upper panel 3 is welded at the rear lateral end portions to front pillars 6 (only one is shown) and at the front end to the upper end of the dash lower panel 1 as shown in FIG. 9. The cowl top front plate 4 is welded to the front end of the dash upper panel 3 in such a way as to extend upwardly therefrom.

Welded to the front lateral end portion of the dash upper panel 3 and the lateral end of the cowl top front plate 4 is a hood ledge panel 7 which extends longitudinally of the vehicle body. Welded to the rear upper end portion of the hood ledge panel 7 and the lateral end of the dash upper panel is a dash side panel 5. A hood ledge reinforce 8 extends over the hood ledge panel 7, dash side panel 5 and front pillar 6 and is welded to same. The hood ledge panel 7 is integrally formed with a strut mount housing 9 for receiving and supporting a front suspension strut (not shown). As shown in FIG. 10, a small gap or clearance "a" is formed between the dash side panel 5 and front pillar 6.

In the above structure, vertical vibrations transmitted from the front wheels to the struts during running of the vehicle subject the upper end portion of the strut mount housing 9 to such a force that causes the strut mount housing 9 and therefore the hood ledge panel 7 and hood ledge reinforce 8 to incline in the direction "F", i.e., toward an engine compartment 10. Due to this, it is necessary to provide the air box side structure with some means for preventing the strut mount housing 9 from leaning in the direction "F" by the force applied thereto from the strut. To this end, it has heretofore been practiced to utilize a brace 11 of an L-shaped plane figure and an L-shaped cross section, which extends between the cowl top front plate 4 and hood ledge panel 7 and is secured to same as for example disclosed in Japanese provisional Utility Model Publication No. 59-172615.

In the meantime, a bracket 12 for installation of a wiper pivot is provided to the the rear upper end portion of the dash upper panel 3.

In the prior art structure, the brace 11 and bracket 12 are independent parts and disposed independently on the opposite sides of the air box 2.

SUMMARY OF THE INVENTION

In accordance with the present invention, there is provided a front structure for an automotive vehicle which comprises a dash lower panel, a pair of front pillars disposed at opposite lateral ends of the dash lower panel, an air box extending along an upper end of the dash lower panel and secured to same, the air box being further secured at opposite lateral end portions thereof to the front pillars, a pair of hood ledge means each secured at a rear end portion thereof to each lateral end portion of the air box and each front pillar and a pair of braces for preventing the hood ledge means from leaning toward an engine compartment of the vehicle, each disposed between each lateral end portion of the air box and each hood ledge means and secured to same. Each brace is further secured at a rear end thereof to each front pillar and integrally formed with a wiper pivot mounting portion.

The above structure is desirable from the point of view of management of its constituent parts and from the point of view of a number of necessary manufacturing and assembling processes.

It is accordingly an object of the present invention to provide an improved front structure for an automotive vehicle which can reduce the number of constituent parts and therefore the number of assembling processes as well as can increase the structure rigidity, particularly the structural rigidity for resisting against inclination of a hood ledge panel, hood ledge reinforce, etc. toward an engine compartment.

BRIEF DESCRIPTION OF THE DRAWINGS

FIG. 5 is a sectional view taken along the line V—V of FIG. 1;

FIG. 6 is a sectional view taken along the line VI—VI of FIG. 1;

FIG. 7 is a sectional view taken along the line VII—VII of FIG. 1;

DESCRIPTION OF THE PREFERRED EMBODIMENT

Referring to FIGS. 1 to 7, a dash lower panel 13 is integrally formed with a vehicle floor (not shown) and extends upwardly therefrom. Disposed above the dash lower panel 13 is an air box 14.

Figure 1:
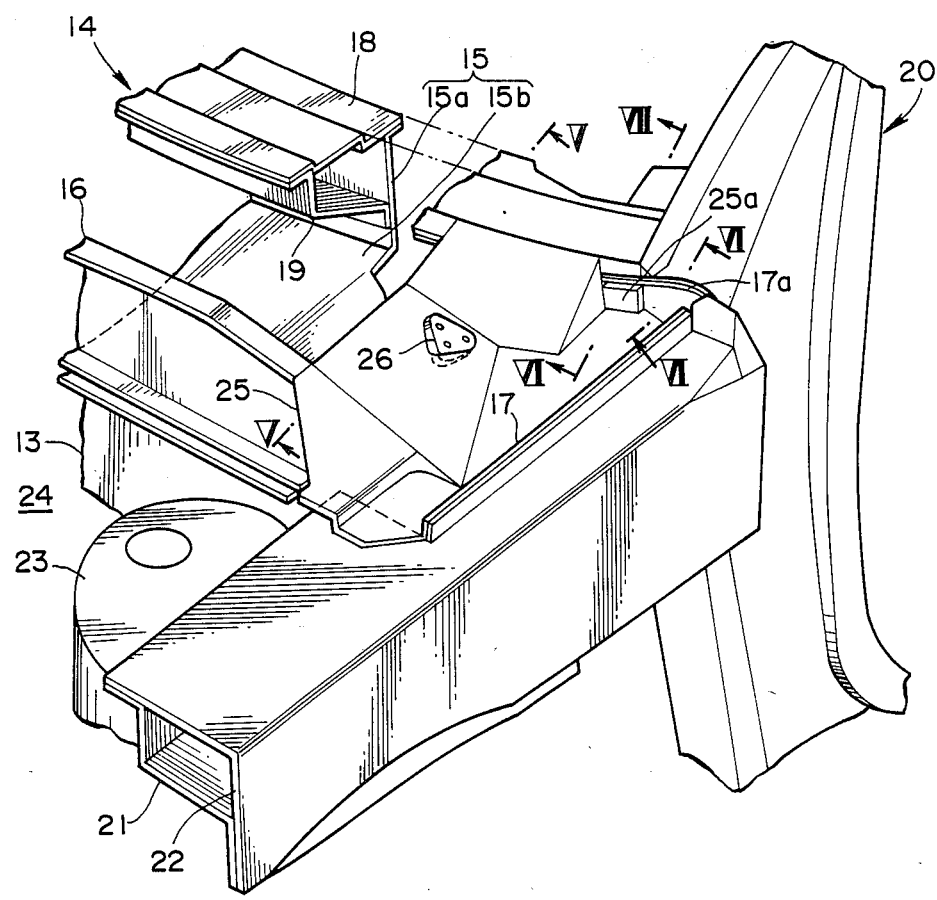
FIG. 1 is a perspective, partly cutaway, view of an automotive vehicle front structure according to an embodiment of the present invention.
Figure 2:
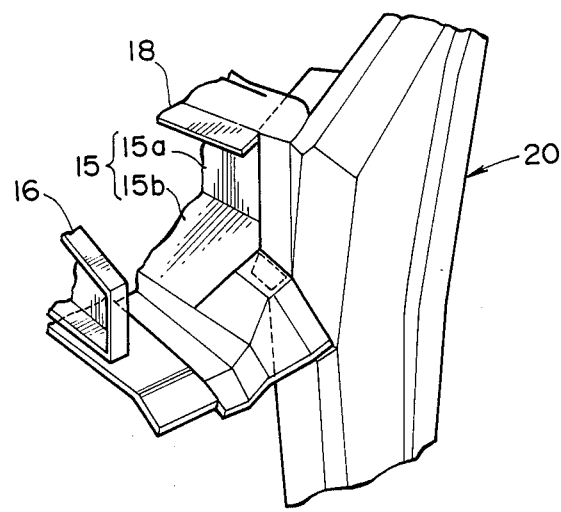
FIGS. 2 to 4 is foreshortened perspective views of the front structure of FIG. 1, with some parts being omitted.

The air box 14 consists of a dash upper panel 15, cowl top front plate 16, dash side panel 17, upper dash cross member 18 and lower dash cross member 19. The dash upper panel 15 has an upstanding or vertical rear end wall 15a and a bottom wall 15b extending forwardly and downwardly from the lower end thereof. The rear end wall 15a is welded at the opposite lateral ends to front pillars 20 (only one is shown) as shown in FIGS. 1 and 7. The bottom wall 15b is welded at the front end to the upper end of the dash lower panel 13 as shown in FIG. 5. The upper dash cross member 18 is welded at the rear end portion to the upper end portion of the rear end wall 15a and extends forwardly therefrom. The lower dash cross member 19 is slant disposed between the front end lower face of the upper dash cross member 18 and the front face lower portion of the rear end wall 15a of the dash upper panel 15 and secured to same. The cowl top front plate 16 is welded to the front end of the bottom wall 15b in such a way as to extend upwardly therefrom as shown in FIGS. 2 and 5. As shown in FIG. 7, the front piller 20 has a pillar outer panel 20a and pillar inner panel 20b.

Figure 3:
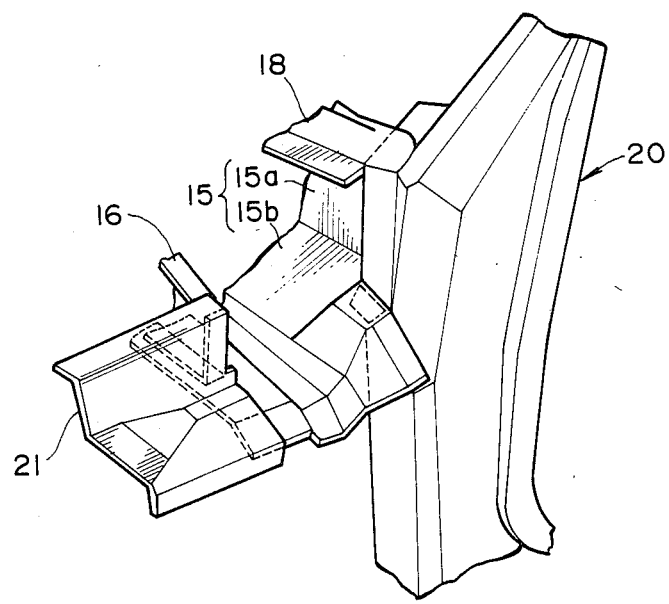
Figure 4:
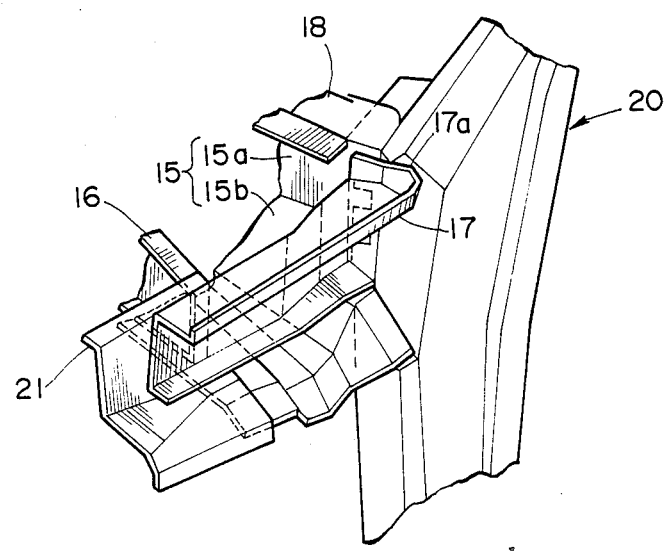
Figure 8:
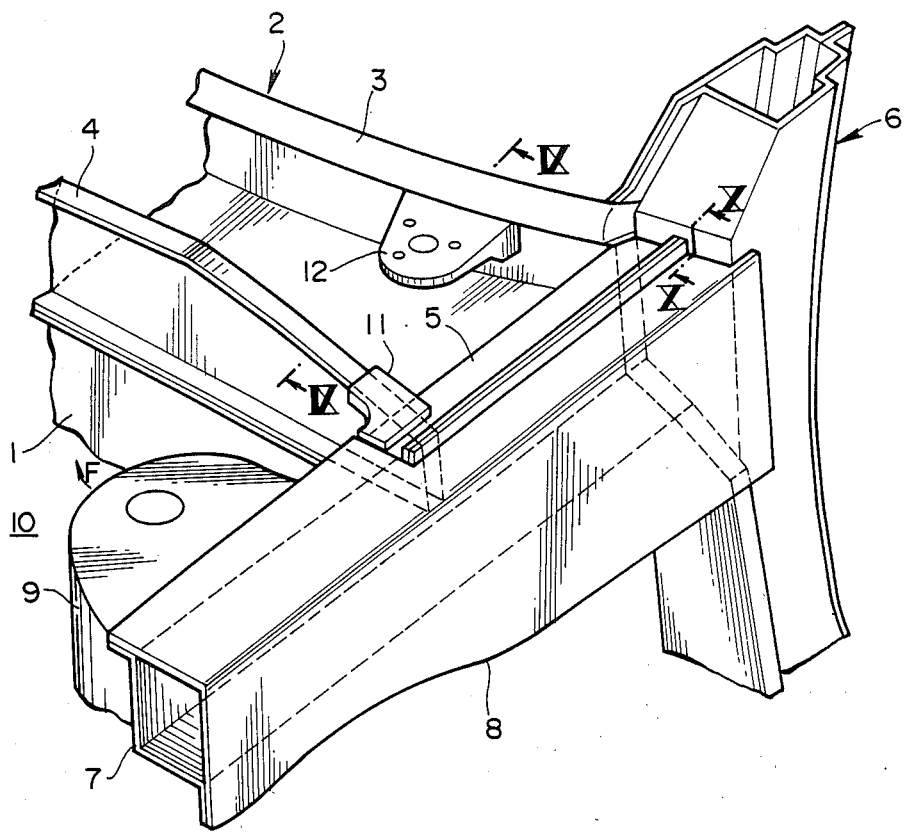
FIG. 8 is a view similar to FIG. 1 but showing a prior art front structure.
Figure 9:
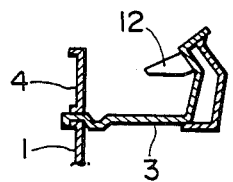
FIG. 9 is a sectional view taken along the line IX—IX of FIG. 8.
Figure 10:
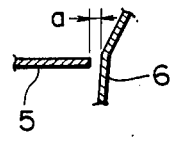
FIG. 10 is a sectional view taken along the line X—X of FIG. 8.

Welded to the front lateral end portion of the bottom wall 15b of the dash upper panel 15 and the lateral end of the cowl top front plate 16 is a rear and portion of a hood ledge panel (hood ledge means) 21 which extends longitudinally of the vehicle body as shown in FIG. 3. Welded to the rear end portion of the hood ledge panel 21, the lateral end portion of the dash upper panel 15 and the front pillar 20 is a dash side panel 17 as shown in FIGS. 4, 6 and 7. The dash side panel 17 has a rear end flange 17a which is welded to the front pillar 20. A hood ledge reinforce (constituting hood ledge means together with the hood ledge panel 21) 22 extends over the hood ledge panel 21, dash side panel 17 and front pillar 20 and is welded to same. The hood ledge reinforce 22 is integrally formed with a strut mount housing 23 for receiving and supporting a front suspension strut (not shown).

Installed on the lateral end portions of the air box 14 is a brace 25 for preventing the hood ledge panel 21 and hood ledge reinforce 22 from leaning toward the engine compartment 24. The brace 25 is welded to the cowl top front plate 16, dash side panel 17, upper dash cross member 18 and hood ledge reinforce 22 as shown in FIGS. 1 and 5. Further, the upper rear end of the brace 25 is formed with a rear end flange 25a and welded thereat to the rear end flange 17a of the dash side panel 17. By this, the brace 25 is rigidly secured at the rear end to the front pillar 20 by way of the rear end flanges 17a and 25a. Further, the brace 25 is formed with a portion 26 adapted for installation of a wiper pivot (not shown).

From the foregoing, it will be understood that a brace for preventing inclination of hood ledge means toward an engine compartment is secured to a front lateral end portion of an air box, hood ledge member and front pillar and is provided with a portion adapted for installation of a wiper pivot, whereby to constitute an automotive vehicle front structure which is desirable from the point of view of the management of its constituent parts and from the point of view of a number of necessary manufacturing and assembling processes and which makes it possible to increase the structral strength adjacent the lateral ends of the air box.

What is claimed is:

1. A front structure for an automotive vehicle, comprising:
   a dash lower panel;
   a pair of front pillars disposed at opposite lateral ends of said dash lower panel;
   an air box extending along an upper end of said dash lower panel and secured to same, said air box being further secured at opposite lateral end portions thereof to said front pillars;
   a pair of hood ledge means each secured at a rear end portion thereof to each lateral end portion of said air box and each front pillar; and
   a pair of braces for preventing said hood ledge means from leaning toward an engine compartment of the vehicle, each disposed between each lateral end portion of said air box and each hood ledge means and secured to same;
   each brace being further secured at a rear end portion thereof to each front pillar and integrally formed with a wiper pivot mounting portion.

2. The front structure according to claim 1 wherein said air box has a dash upper panel having an upstanding rear end wall and a bottom wall extending forwardly from a lower end of said rear end wall, said rear end wall being secured at lateral ends thereof to said front pillars, said bottom wall being secured at a front end thereof to said upper end of said dash lower panel.

3. The front structure according to claim 3 further comprising an upper dash cross member and a lower dash cross member, said upper dash cross member being secured at a rear end thereof to an upper end of said rear end wall of said dash upper panel, said lower dash cross member being slant disposed and secured at a front upper end thereof to a front end of said upper dash cross member and at a rear lower end thereof to a lower portion of said rear end wall of said dash upper panel, said brace being secured at said rear end thereof to said front end portions of said upper dash cross member and said lower dash cross member.

4. The front structure according to claim 3 wherein said air box further has a cowl top front plate secured at a lower end portion thereof to said upper end of said dash lower panel, said brace being secured at a front end thereof to an upper end of said cowl top front plate.

5. The front structure according to claim 4 wherein said hood ledge means comprises a pair of hood ledge panels each secured at a rear end portion thereof to each front lateral end portion of said bottom wall of said dash upper panel and each lateral end of said cowl top front plate.

6. The front structure according to claim 5 wherein each hood ledge panel is provided with a strut mount housing.

7. The front structure according to claim 5 wherein said air box further comprises a pair of dash side panels each secured to a rear end portion of each hood ledge panel and each lateral end of said dash upper panel, each dash side panel having a rear end flange at which it is secured to each front pillar.

8. The front structure according to claim 6 wherein each hood ledge means further comprises a hood ledge reinforce which extends over each hood ledge panel and each dash side panel and secured to same.

* * * * *

UNITED STATES PATENT AND TRADEMARK OFFICE
CERTIFICATE OF CORRECTION

PATENT NO. : 4,886,314

DATED : December 12, 1989

INVENTOR(S) : RYOJI MAEDA

It is certified that error appears in the above-identified patent and that said Letters Patent is hereby corrected as shown below:

```
    Foreign Application Priority Data should only list
the following:

Feb. 10, 1988 [JP]  Japan ....................63-16680[U]
```

Signed and Sealed this

Fifth Day of March, 1991

Attest:

HARRY F. MANBECK, JR.

*Attesting Officer*  *Commissioner of Patents and Trademarks*